US009756473B2

(12) United States Patent
Lee et al.

(10) Patent No.: US 9,756,473 B2
(45) Date of Patent: *Sep. 5, 2017

(54) METHOD AND APPARATUS FOR PROVIDING POSITIONAL INFORMATION USING WIRELESS FIDELITY (WIFI) INFORMATION

(71) Applicant: NAVER Business Platform Corp., Seongnam-Si, Gyeonggi-Do (KR)

(72) Inventors: Ho Jin Lee, Seoul (KR); Eun Yong Cheong, Seongnam-si (KR); Byung-Jo Kim, Seongnam-si (KR); Byeongryeol Sim, Seongnam-si (KR); Jaewook Yoo, Seongnam-si (KR)

(73) Assignee: Naver Business Platform Corp., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,139

(22) Filed: Mar. 11, 2016

(65) Prior Publication Data
US 2016/0198305 A1    Jul. 7, 2016

Related U.S. Application Data

(63) Continuation of application No. 14/086,299, filed on Nov. 21, 2013, now Pat. No. 9,374,663.

(30) Foreign Application Priority Data

Jan. 16, 2013  (KR) .................. 10-2013-0004783

(51) Int. Cl.
H04W 4/02      (2009.01)
H04W 64/00     (2009.01)
(Continued)

(52) U.S. Cl.
CPC .............. *H04W 4/025* (2013.01); *G01S 5/02* (2013.01); *H04W 4/02* (2013.01); *H04W 64/00* (2013.01); *H04W 84/12* (2013.01)

(58) Field of Classification Search
CPC ..... H04W 64/00; H04W 84/12; H04W 88/08; H04W 8/005; G01S 5/0242; H04L 29/12839; H04L 61/6022
See application file for complete search history.

(56) References Cited

U.S. PATENT DOCUMENTS 8,305,951 B1 * 11/2012 Breau ................ H04H 20/61
                                                 370/312
2004/0064334 A1    4/2004 Nye
(Continued)

FOREIGN PATENT DOCUMENTS

JP      2008-536348 A     9/2008
JP      2011521253 A      7/2011
(Continued)

OTHER PUBLICATIONS

Korean Office Action dated Mar. 26, 2014 corresponding to Korean Application No. 10-2013-0004783.
(Continued)

Primary Examiner — Nathan Mitchell
Assistant Examiner — Ernest Tacsik
(74) Attorney, Agent, or Firm — Harness, Dickey & Pierce P.L.C.

(57) ABSTRACT

A method and apparatus for providing positional information using wireless fidelity (WiFi) information is provided. A method of providing positional information at a mobile terminal may include collecting WiFi access point (AP) information by scanning for a WiFi AP in a vicinity of the mobile terminal, extracting facility information associated with a facility associated with the WiFi AP, and determining
(Continued)

the positional information of the mobile terminal based on the extracted facility information.

20 Claims, 6 Drawing Sheets

(51) Int. Cl.
*G01S 5/02* (2010.01)
*H04W 84/12* (2009.01)

(56) References Cited

U.S. PATENT DOCUMENTS

| | | |
|---|---|---|
| 2005/0260973 A1 | 11/2005 | van de Groenendaal |
| 2006/0240840 A1 | 10/2006 | Morgan et al. |
| 2008/0072285 A1 | 3/2008 | Sankaran et al. |
| 2009/0054096 A1 | 2/2009 | Single |
| 2010/0120422 A1 | 5/2010 | Cheung et al. |
| 2012/0116677 A1 | 5/2012 | Higgison et al. |
| 2012/0257753 A1 | 10/2012 | Ochikubo et al. |

FOREIGN PATENT DOCUMENTS

| | | |
|---|---|---|
| JP | 2012-142911 A | 7/2012 |
| JP | 2012205202 A | 10/2012 |
| JP | 2013189082 A | 9/2013 |
| JP | 2014-023147 A | 2/2014 |
| KR | 10-2011-0065272 A | 6/2011 |
| KR | 2011-0135026 A | 12/2011 |
| KR | 10-2012-0087471 A | 8/2012 |
| KR | 10-2013-0000824 A | 1/2013 |

OTHER PUBLICATIONS

Japanese Office Action dated Aug. 26, 2014 in corresponding Japanese Application No. 2013-189082.
Japanese Office Action dated Jul. 18, 2017 for corresponding Japanese Patent Application No. 2014-238745.
He, Tao et al., "Adaptation of Integrity Maintenance Method for location Estimation to Large Scale Wireless LAN Observation Database," IEICE Technical Report, Mobile Multimedia Communications, Nov. 17-18, 2011, pp. 1-9.

* cited by examiner

METHOD AND APPARATUS FOR PROVIDING POSITIONAL INFORMATION USING WIRELESS FIDELITY (WIFI) INFORMATION

CROSS-REFERENCE TO RELATED APPLICATION

This application is a continuation of U.S. patent application Ser. No. 14/086,299, filed Nov. 21, 2013, which claims the benefit of priority under 35 U.S.C. §119 from Korean Patent Application No. 10-2013-0004783, filed on Jan. 16, 2013, which is hereby incorporated by reference in its entirety for all purposes as if fully set forth herein.

BACKGROUND

Field

Example embodiments relate to a method and system for providing positional information using wireless network information that may include information associated with a facility in which a user is currently located using WI-FI information.

Description of the Background

Currently, with the wide spread of mobile terminals, such as smart phones, tablet personal computers (PCs), and the like, users of the mobile terminals may use a variety of information and services without restrictions on a time and/or occasion. Accordingly, location based services and/or applications, for example, a service of notifying a current location of a user, a service of notifying a location that a user desires to search for, and/or a location that the user desires to visit, have been developed into a variety of forms.

Such location based services may be applied to a bus/subway arrival time notification, navigation, and the like, and may provide information suitable for a variety of purposes. However, to provide the location based service to a user, an operation of obtaining positional information associated with a location of the user or a target object is required. The positional information is generally obtained based on a global positioning system (GPS) signal. In the case of obtaining the positional information based on the GPS signal, difficulty is found in measuring an actual location of a user in a shadowing region of a GPS signal, such as a space between buildings, inclement weather, and/or the like, or a region in which the GPS signal may not arrive, such as an inside of a building or subway station.

Accordingly, as disclosed in Korean Patent Publication No. 10-2011-0135026, published on Dec. 16, 2011, entitled "Subway destination arrival alert system and method, mobile terminal and server thereof", employed is a location prober to generate a location probing pilot signal capable of individually verifying an accurate location instead of using a GPS signal even though a vehicle in which a user of a mobile communication terminal is riding is driving in a subway. Therefore, since GPS measurement is impossible in a subway, a location of the user of the mobile communication terminal may not be verified. In addition, due to use of a communication repeater incapable of providing accurate location identification information according to an installation location, an accurate location of the user of the mobile communication terminal may not be verified.

In the existing methods, a separate apparatus needs to be associated with each facility such as a subway station and a bus stop so as to provide a location based service. Alternatively, communication with a server needs to be performed periodically over a mobile terminal or a communication network.

SUMMARY

Various example embodiments provide a method and apparatus for providing positional information using wireless fidelity (WI-FI) information that may provide positional information to a user without using a global positioning system (GPS) or without requiring a separate measurement apparatus in an existing facility.

According to an example embodiment, a method of determining positional information using a mobile terminal is provided. The method includes collecting WI-FI access point (AP) information by scanning for a WI-FI AP in a vicinity of the mobile terminal, extracting facility information associated with a facility associated with the WI-FI AP, and determining the positional information of the mobile terminal based on the extracted facility information.

In example embodiments, that the collecting includes obtaining a media access control (MAC) address of the WI-FI AP in the vicinity of the mobile terminal.

In example embodiments, the WI-FI AP is one among a plurality of WI-FI APs. Some of the WI-FI plurality of WI-FI APs being in the vicinity of the mobile terminal. Each of the plurality of WI-FI APs being associated with WI-FI AP information. The collecting includes collecting the WI-FI AP information of the plurality of WI-FI APs that are in the vicinity of the mobile terminal.

In example embodiments, the extracting may include comparing each of the collected WI-FI AP information with WI-FI AP information stored in a database, determining at least one match based on the comparing, and extracting facility information according to the determined at least one match. Each of the stored WI-FI AP information may be associated with a facility.

In example embodiments, the determining the positional information includes counting a number of times that the facility information is extracted and determining that the positional information is a location of the facility based on the counting.

In example embodiments, the method may further include adding the extracted facility information to a candidate location of the mobile terminal and determining that the candidate location of the mobile terminal to be the positional information if the comparison does not yield at least one match.

In example embodiments, the database may include WI-FI AP information collected from a plurality of facilities. Each of the plurality of facilities may include at least one of stationary WI-FI APs and mobile WI-FI APs. The database is configured by filtering information associated with the mobile WI-FI APs from information associated with the stationary WI-FI APs, and by mapping the filtered WI-FI AP information to facility information associated with a facility of the plurality of facilities from which the filtered WI-FI AP information is collected.

In example embodiments, each collected WI-FI AP information may include a service set identifier (SSID) including at least one keyword. The filtering may comprise searching the collected WI-FI AP information to find a SSID having a desired keyword and removing the found WI-FI AP information from the collected WI-FI AP information.

In example embodiments, the filtering may include removing, from the collected WI-FI AP information, WI-FI AP information having a same MAC address as WI-FI AP information collected from other facilitates of the plurality of facilities.

In example embodiments, the removing is performed when the other facilities are located within a desired range.

In example embodiments, the method may further include determining a pattern between MAC addresses of the WI-FI AP information collected from the plurality of facilities, predicting a MAC address for each of the collected WI-FI APs based on the determined pattern, and adding the predicted MAC addresses to the database or filtering information associated with the WI-FI AP corresponding to the predicted MAC address from the WI-FI AP information collected from the plurality of facilities.

In example embodiments, the method may further include receiving at least one of the facility information and a location based service based on the facility information.

According to an example embodiment, a non-transitory computer-readable recording medium storing a program for providing facility information to a mobile terminal when the program is executed by a processor of the mobile terminal is provided. The processor is configured to collect WI-FI AP information by scanning for a WI-FI AP in a vicinity of the mobile terminal, extract facility information associated with a facility associated with the WI-FI AP, determine positional information of the mobile terminal based on the extracted facility information, and provide at least one of the facility information and a location based service based on the facility information.

According to an example embodiment, an apparatus for distributing an application for providing facility information to a mobile terminal when the application is executed by a processor of the mobile terminal is provided. The apparatus may include an application providing module configured to provide the application to the mobile terminal. The application is provided to a mobile terminal, the mobile terminal is configured to collect WI-FI AP information by scanning for a WI-FI AP in a vicinity of the mobile terminal, extract facility information associated with a facility associated with the WI-FI AP, determine positional information of the mobile terminal based on the extracted facility information, and provide at least one of the facility information and a location based service based on the facility information.

According to an example embodiment, an apparatus for configuring a database for providing positional information is provided. The apparatus may include a receiving module configured to receive WI-FI AP information collected from a plurality of facilities, where each of the plurality of facilities includes at least one of stationary WI-FI APs and mobile WI-FI APs. The apparatus may include a processing module configured to filter received mobile WI-FI AP information from received stationary WI-FI AP information and map the filtered WI-FI AP information to facility information associated with a facility of the plurality of facilities from which the filtered WI-FI AP information is collected. The apparatus may include a configuring module configured to configure the database according to the WI-FI AP information processed by the processing module.

In example embodiments, the WI-FI AP information may include a MAC address and a SSID.

In example embodiments, the processing module is configured to search the collected WI-FI AP information to find an SSID including a desired keyword and remove the found WI-FI AP information from the collected WI-FI AP information.

In example embodiments, the processing module is configured to remove, from the collected WI-FI AP information, WI-FI AP information having a same MAC address as the WI-FI AP information collected from other facilities of the plurality of facilities.

In example embodiments, when the other facilities are located within a desired range, the processing module is configured to remove, from the collected WI-FI AP information, information associated with the WI-FI APs having the same MAC address as the WI-FI AP information collected from the other facilities.

In example embodiments, the apparatus further includes a predicting module configured to predict a MAC address of a WI-FI AP located at each of the plurality of facilities by determining a pattern between MAC addresses of the collected WI-FI APs, and process the collected WI-FI AP information by adding the predicted MAC address to the collected WI-FI AP information.

In example embodiments, the processing module is configured to remove WI-FI AP information associated with the predicted MAC address from the collected WI-FI AP information.

In example embodiments, the apparatus further includes a providing module configured to provide the configured database to the mobile terminal for determining positional information, in an encrypted library form It is to be understood that both the foregoing general description and the following detailed description are explanatory and are intended to provide further explanation of the example embodiments as claimed.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of the example embodiments.

DETAILED DESCRIPTION OF EXAMPLE EMBODIMENTS

Figure 1:
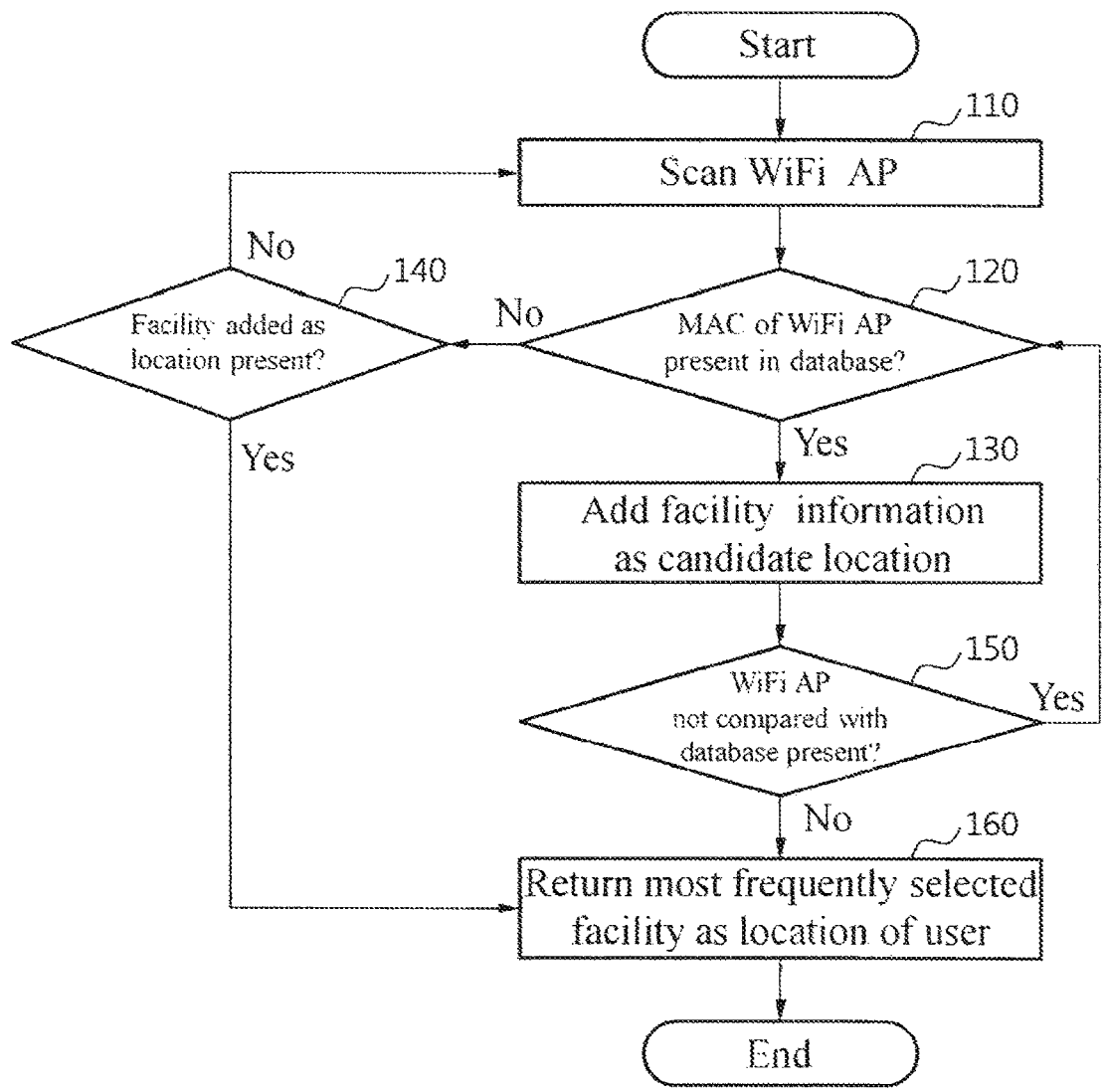
FIG. 1 is a flowchart illustrating a method of providing positional information using a mobile terminal according to example embodiments.

The invention is described more fully hereinafter with reference to the accompanying drawings, in which example embodiments are shown. This invention may, however, be embodied in many different forms and should not be construed as limited to the example embodiments set forth herein. Rather, these example embodiments are provided so that this disclosure is thorough, and will fully convey the scope of the invention to those skilled in the art. In the drawings, the size and relative sizes of layers and areas may be exaggerated for clarity. Like reference numerals in the drawings denote like elements.

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described in detail with reference to the accompanying drawings.

A method and apparatus for providing positional information according to example embodiments may provide a variety of location based services to a user of a mobile terminal, such as a service of providing information associated with a facility in which the user is currently located, and a service of notifying the user when the user arrives to a desired destination or with a desired proximity of the desired destination. Here, the mobile terminal may refer to a portable terminal having a wireless fidelity (WI-FI) function and may include, for example, a smart phone, a portable multimedia media (PMP), a tablet personal computer, a laptop, or other like portable computing device.

A method and apparatus for providing positional information according to example embodiments may determine that a user is present within a corresponding facility and provide a service to the user when information associated with a WI-FI access point (AP) present within the corresponding facility is collected at a mobile terminal using WI-FI APs placed in, or otherwise associated with many facilities, for example, buildings, buses, bus stops, subways, and subway stations. Here, WI-FI AP information present within each facility is present within the mobile terminal of the user and thus, the mobile terminal may not be able to perform separate communications operations with a server and/or other wireless devices. Accordingly, on a user side, it is possible to save costs associated with data transmissions being sent to the user and to decrease an amount of time used for request and response. Also, a service provider may not require additional costs for constructing an infrastructure for providing such a service.

FIG. 1 is a flowchart illustrating a method of providing positional information using a mobile terminal according to an example embodiment. Here, an example of providing a user with information associated with a facility in which the user is currently located using a mobile terminal will be described with reference to FIG. 1.

The method of providing location information may be performed by an application associated with or otherwise used by the mobile terminal. The mobile terminal may be a hardware computing device including one or more processors, a computer-readable storage medium, a transceiver, and/or one or more electronic image sensors. The mobile terminal may be capable of sequentially and automatically performing a sequence of arithmetic or logical operations; equipped to record/store digital data on a machine readable medium; and transmit and receive digital data via one or more network devices. The mobile terminal may be configured to send/receive data to/from network devices, such as a router, switch, or other like network devices, via a wireless connection. The mobile terminal may include user terminals, such as smart phones, tablet PCs, and/or any other physical or logical device capable of recording, storing, and/or transferring digital data via a connection to a network device. The application used by the mobile terminal may include a code to collect WI-FI AP information by scanning a WI-FI AP adjacent to, proximate to, or otherwise in a vicinity of the mobile terminal, a code to extract information associated with a facility from which matching WI-FI AP information is collected by comparing the collected WI-FI AP information with WI-FI AP information pre-stored in a database, a code to determine a location of the mobile terminal based on the extracted facility information, and/or a code to provide the facility information or provide a location based service based on the facility information.

Referring to FIG. 1, in operation 110, the application used by in the mobile terminal scans a WI-FI AP. In various embodiments, to perform wireless communication through a WI-FI AP, a function and/or a code for scanning a WI-FI AP in a vicinity of the mobile terminal may be embedded within the mobile terminal. Thus, the mobile terminal may scan for WI-FI Aps that are in a vicinity of the mobile terminal using a WI-FI AP scanning function so as to provide positional information to a user of the mobile terminal. In various embodiments, the scanning function of the application may include extracting, obtaining, or otherwise collecting a media access control (MAC) address or other like identification information of the WI-FI AP proximate to the mobile terminal.

In operation 120, the application determines whether the collected WI-FI AP information is present in a database of the mobile terminal. In various embodiments, the mobile terminal may compare the collected WI-FI AP information (i.e., as collected in operation 110) with WI-FI AP information that is included in a storage area of the mobile terminal or pre-stored in the database of the application. In some embodiments, the database may be encrypted and may also be stored in a library form in the mobile terminal.

In various embodiments, the database may be configured to filter, from WI-FI AP information collected from a plurality of facilities, information associated with a mobile WI-FI AP that is not fixably installed or otherwise placed in a corresponding facility, and thus, is collected when WI-FI information is collected from the corresponding facility. Additionally, the WI-FI AP information may be mapped to information associated with a facility from which the corresponding WI-FI AP information is collected. Accordingly, the database may include only fixed WI-FI AP information that is fixably associated with the corresponding facility.

To this end, the mobile WI-FI AP information may be filtered through, for example, a process of searching the WI-FI AP information collected from the plurality of facilities for information associated with a WI-FI AP having a service set identifier (SSID) or other like identification information including a predetermined keyword and removing the found WI-FI AP information from the WI-FI AP information collected from the plurality of facilities.

In various embodiments, when WI-FI APs having the same information are present in different facilities, erroneous positional information may be provided to the mobile terminal. Accordingly, by removing, from the WI-FI AP information collected from the plurality of facilities, information associated with WI-FI APs having the same MAC address in WI-FI AP information collected from the different facilities, information associated with a WI-FI AP having a different MAC address may be included in the database. However, the aforementioned process may be performed in a cases in which facilities corresponding to information associated with the WI-FI APs having the same MAC address are located within a predetermined and/or desired range, for example, a range in which an error may occur in providing positional information, and may not be performed in a case in which the facilities are located outside the predetermined range.

Meanwhile, MAC addresses of WI-FI APs associated with similar facilities, such as, WI-FI APs associated with or associated with subway stations and/or associated with bus stops, may generally have a uniform pattern. For example, in embodiments utilizing MAC addresses, the MAC addresses of WI-FI APs associated with a series of subway stations may have the same or similar most significant bits (MSBs) and/or Organizationally Unique Identifier (OUI) bits as defined by the Institute of Electrical and Electronics Engineers (IEEE). Accordingly, a MAC address of a WI-FI AP may be predicted by analyzing a pattern between MAC addresses of WI-FI APs collected from the plurality of facilities may be added to the database. In the case of collecting WI-FI AP information is collected from the plurality of facilities, even if only a physical address of a WI-FI AP is collected, a virtual address of the corresponding WI-FI AP may be added to the database. In addition, even in the case of a mobile WI-FI AP, more accurate positional information may be provided by filtering a MAC address predicted from a MAC address of the mobile WI-FI AP from the WI-FI AP information collected from the plurality of facilities through a pattern analysis.

Referring back to FIG. 1, if in operation 120, the application determines that the MAC address of the WI-FI AP is present in the database, then the application proceeds to operation 130 to add facility information as a candidate location. As discussed above, the application may compare a plurality of sets of WI-FI AP information collected by scanning a plurality of WI-FI APs in a vicinity of the mobile terminal with WI-FI AP information stored in the database configured through the above process. As a result of the comparing, when a matching WI-FI AP information is present within the database, the application may extract or otherwise obtain information associated with a facility from which the matching WI-FI AP information is collected, and may add the extracted facility information as a candidate location.

Conversely, if in operation 120, the application determines that the MAC address of the WI-FI AP is not present in the database, then the application proceeds to operation 140 to determine whether a facility added as a candidate location is present. If the facility added as the candidate location is determined to be absent from the database, the application may proceed to operation 110 to scan for a WI-FI AP adjacent to the mobile terminal. However, if the facility added as the candidate location is determined to be present in the database, the application proceeds to operation 160 to return a most frequently selected facility as a location of the user.

Referring back to operation 130, once the facility information is added as a candidate location, the application proceeds to operation 150 to determine WI-FI AP information not compared with the WI-FI AP information stored in the database is absent. If the application determines that the WI-FI AP information stored in the database is absent, the application proceeds to operation 120 to determine whether the collected WI-FI AP information is present in a database of the mobile terminal.

In various embodiments, when a plurality of sets of information associated with a plurality of WI-FI APs adjacent to the mobile terminal is collected, the application may continuously compare each of the collected plurality of sets of WI-FI AP information with the WI-FI AP information pre-stored in the database until WI-FI AP information not compared with the WI-FI AP information stored in the database is absent, and may repeat operations 120-150 until all of the collected plurality of sets of WI-FI AP information are compared with the WI-FI AP information stored in the database.

Referring back to operation 150, if the application determines that the WI-FI AP information stored in the database is present, the application proceeds to operation 160 to return a most frequently selected facility as a location of the user. When it is determined that all of the collected WI-FI AP information is compared with the WI-FI AP information stored in the database, the application may count, for each facility, the number of times that facility information is extracted as the candidate location. The application may determine a facility corresponding to the largest number of times that the facility information is extracted and/or collected to be a facility in which the user of the mobile terminal is currently located, and may return information associated with the determined facility.

By displaying, on a display of the mobile terminal, the facility determined as the facility in which the user of the mobile terminal is currently located, the application may provide information associated with the determined facility or may provide a location based service, such as a destination arrival notification service, based on information associated with the determined facility.

When information associated with a destination, for example, a name of a predetermined facility is received from a user desiring to move to the predetermined facility, the application may extract, from the database, WI-FI AP information collected from the predetermined facility based on the received facility information, and may compare the extracted WI-FI AP information with WI-FI AP information collected by scanning a WI-FI AP. In the case of matching, the application may also provide a notification service indicating that the user has arrived at the desired destination.

Additionally, the application may provide information associated with the determined facility to one or more advertisers in order to provide facility-based advertisements to the mobile terminal. For example, the facility-based advertisements may be based on, or associated with vendors that are located at the determined facility. In such embodiments, vendors that are located at the determined facility may have registered or otherwise associated themselves with the determined facility.

Figure 2:
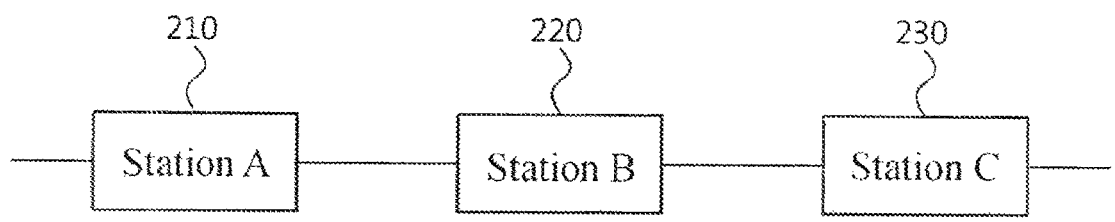
FIG. 2 is a diagram describing an example of providing a location based service to a user in a subway station according to example embodiments.
Figure 3:
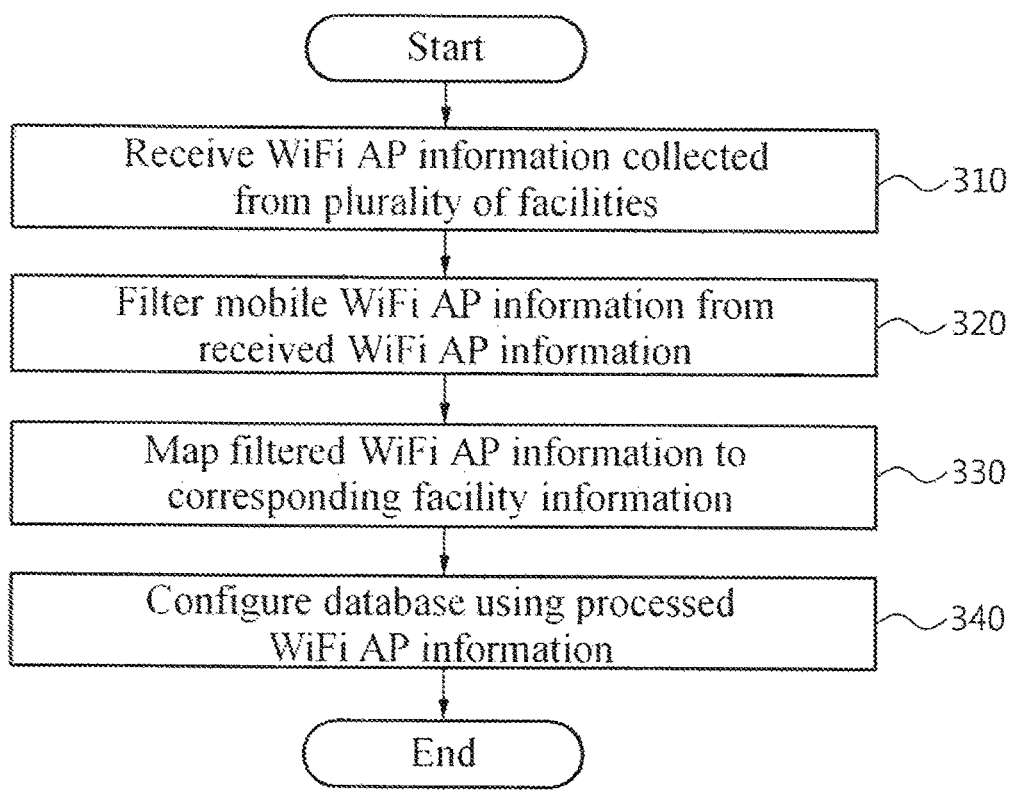
FIG. 3 is a flowchart illustrating a method of configuring a database for providing positional information according to example embodiments.
Figure 4:
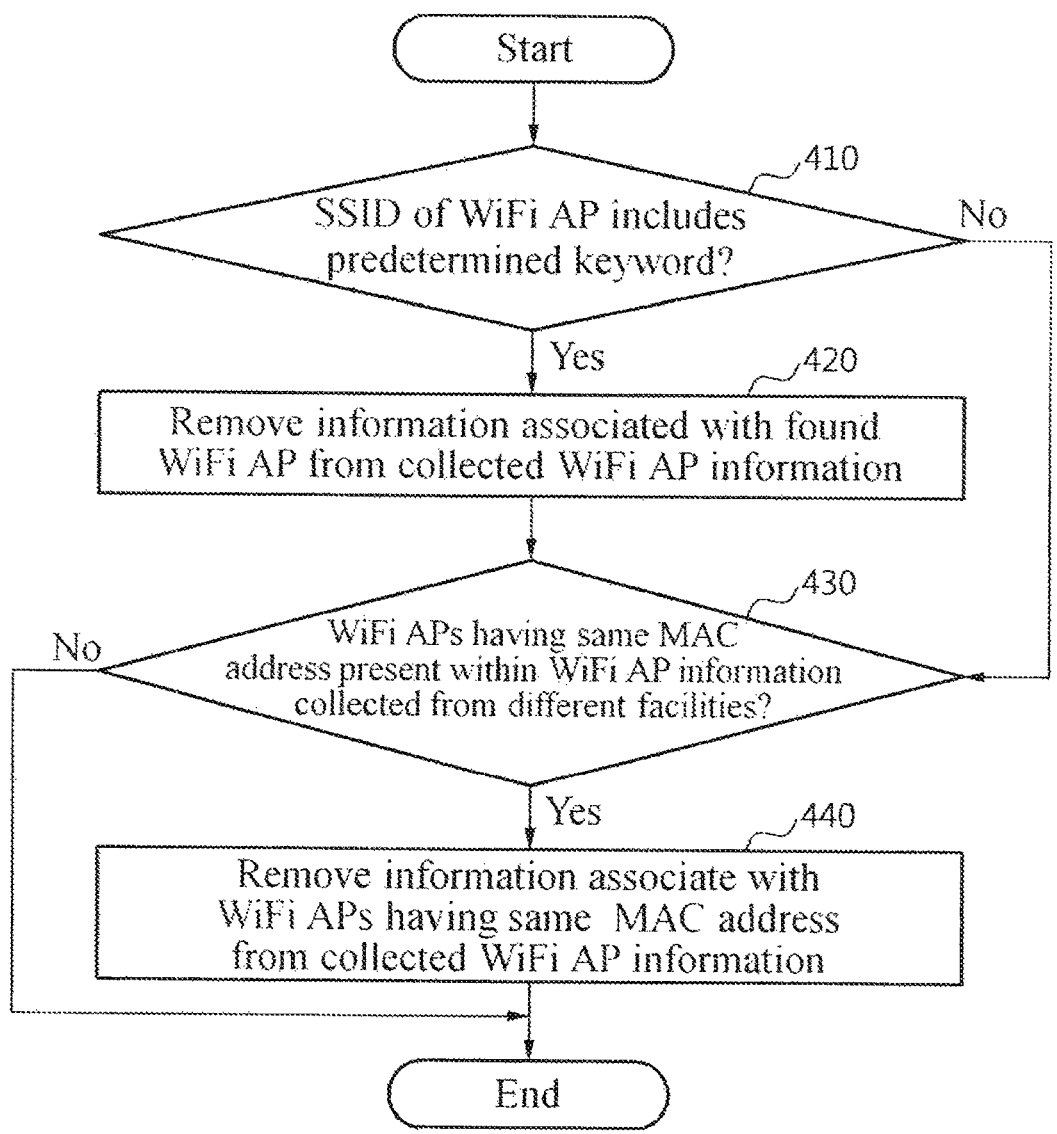
FIG. 4 is a flowchart illustrating a method of filtering unnecessary information from among a plurality of sets of wireless fidelity (WI-FI) access point (AP) information collected from a plurality of facilities according to example embodiments.

FIG. 2 is a diagram describing an example of providing a location based service to a user in a subway station according to an example embodiment, FIG. 3 is a flowchart illustrating a method of configuring a database for providing positional information according to an example embodiment, and FIG. 4 is a flowchart illustrating a method of filtering unnecessary information from among a plurality of sets of WI-FI access point AP information collected from a plurality of facilities according to an example embodiment. Hereinafter, a process of configuring a database for providing positional information in a subway station will be described as an example with reference to FIGS. 2 through 4.

Referring to FIG. 2, in a case in which a station A 210, a station B 220, and a station C 230 are present, a positional information providing method according to example embodiments may provide information associated with a current location of a user at each subway station, for example, each of the station A 210, the station B 220, and the station C 230. In a case in which the user moving from the station A 210 to the station C 230 desires to be informed when the user arrives at the station C 230, the positional information providing method may provide an advance notification service before a corresponding subway train arrives at the station C 230 using a WI-FI AP associated with the station C 230. Additionally, the positional information providing method may provide one or more advertisements associated with the station C 230 before the corresponding subway train arrives at the station C 230 using a WI-FI AP associated with the station C 230. To this end, a process of configuring a database by collecting WI-FI AP information from a platform of each of the station A 210, the station B 220, and the station C 230, and by processing the collected WI-FI AP information may be performed.

Even though the example embodiments described above describe that a WI-FI AP is associated with a platform of each of the station A 210, the station B 220, and the station C 230, a WI-FI AP may also be associated with a passenger car. Accordingly, when WI-FI AP information is collected from a platform of each subway station, information associated with a WI-FI AP associated with a subway train passing through a corresponding subway station may also be collected. Also, information associated with a mobile WI-FI AP, for example, egg and tethering, carried by a user in addition to the WI-FI AP associated with the passenger car may also be collected. Accordingly, to remove such mobile WI-FI AP information, information associated with the WI-FI AP associated with the passenger car may also be collected when collecting WI-FI AP information.

In a case in which a MAC address of a WI-FI AP associated with a platform of a subway station is collected and mapped as "subway station-WI-FI AP", when information associated with the corresponding WI-FI AP is scanned by a mobile terminal of a user, the user may be determined to be present in the subway station to which the corresponding WI-FI AP is mapped. Also, in a case in which a MAC address of a WI-FI AP associated with a passenger car is collected, the collected MAC address may be used to delete information associated with the WI-FI AP associated with the passenger car, which might have been collected when collecting WI-FI AP information from a platform of a subway station. For example, when information associated with a WI-FI AP associated with a passenger car is present in WI-FI AP information collected from a platform of a subway station as a result of comparing information associated with the WI-FI AP associated with the passenger with the WI-FI AP information collected from the platform of the subway station, it may be determined that information associated with the WI-FI AP associated with the passenger car is erroneously collected when collecting the WI-FI AP information from the platform of the subway station. Accordingly, the erroneously collected WI-FI AP information may be deleted.

Referring to FIG. 2, a WI-FI AP may be associated with the station A 210, the station B 220, and the station C 230. For example, WI-FI APs may be installed on a subway track between the station A 210 and the station B 220, and may be installed on a subway track between the station B 220 and the station C 230, respectively. Accordingly, a method and apparatus for providing positional information according to example embodiments may collect Referring to FIG. 3, as shown in operation 310, a database configuring apparatus receives WI-FI AP information collected from a plurality of facilities in order to provide positional information based on information associated with WI-FI APs. As shown in operation 320, the database configuring apparatus filters mobile WI-FI AP information from the received WI-FI AP information. In operation 330, the database configuring apparatus maps the filtered WI-FI AP information to information associated with a facility from which corresponding WI-FI AP information is collected. In operation 340, the database configuring apparatus configures a database based on the processed WI-FI AP information.

In this instance, operations 320 and 330 of processing WI-FI AP information may be a process of determining an accurate location of the user. Accordingly, in the case of substantially collecting information associated with WI-FI APs from subway stations, a MAC address may be duplicated between WI-FI APs collected from different subway stations, or information associated with a mobile WI-FI AP may be collected. As described above, in the case of providing positional information using information associated with the WI-FI AP corresponding to the duplicate MAC address and information associated with the mobile WI-FI AP, erroneous positional information may be provided to the user. Accordingly, to the method as shown in FIG. 4, may provide more accurate positional information using a process of "remaining information" associated with a required WI-FI AP may be used. A method for remaining information associated with a required WI-FI AP may include removing information associated with a WI-FI AP deemed inappropriate for a location based service, or removing a WI-FI AP having a duplicate MAC address as a mobile WI-FI AP.

Referring to FIG. 4, as shown in operation 410, the database configuring apparatus determines if a service set identifier (SSID) of a WI-FI AP includes a predetermined and/or desired keyword. In various embodiments, the database configuring apparatus may store, as a blacklist, information associated with a WI-FI AP having an SSID including a predetermined keyword among the collected WI-FI AP information. When a WI-FI AP corresponding to the blacklist is found in operation 410, the database configuring apparatus may remove information associated with the found WI-FI AP from the collected WI-FI AP information.

Thus, if the database configuring apparatus determines that the SSID of the WI-FI AP includes a predetermined keyword, then the database configuring apparatus proceeds to operation 420 to remove information associated with the found WI-FI AP from the collected WI-FI AP information. Otherwise, if the database configuring apparatus determines that the SSID of the WI-FI AP does not include the predetermined keyword, then the database configuring apparatus proceeds to operation 430 to determine if WI-FI APs having the same MAC address are present within the WI-FI AP information collected from different facilities.

For example, an AP in which a predetermined keyword is included in an SSID may be classified as a mobile AP. Here, the predetermined keyword may be "porthru" indicating an SSID of a printer, "egg" indicating a default SSID of egg, "hotspot" indicating an SSID of a mobile device, "android" indicating an SSID of ANDROID tethering, "korail" indicating an SSID of a wireless AP associated with a passenger car of a subway, and "hpsetup" indicating an SSID of a printer or an official replicator. Accordingly, when processing the collected WI-FI AP information, the AP including the predetermined keyword in the SSID may be filtered. Here, the filtering range may include "Egg", "egg", "eGG", and the like. That is, filtering may be performed regardless of capital and small letters. Further, even though any word is added in front or at the back of the keyword, such as "01 egg", "egg_001", and "sim'sEgg_01", filtering may be performed.

Meanwhile, in the case of a subway station, it may be difficult to collect only information associated with a WI-FI AP associated with a platform of the subway station. Therefore, when configuring a database using information associated with a WI-FI AP associated with a passenger car, which is collected together with the information associated with the WI-FI AP associated with the platform of the subway station, information associated with the WI-FI AP associated with the passenger car may be removed based on SSID filtering. Accordingly, it is possible to more accurately filter mobile WI-FI AP information. As shown in operation 430, the database configuring apparatus proceeds to operation 430 to determine if WI-FI APs having the same MAC address are present within WI-FI AP information collected from different facilities. When WI-FI APs having the same MAC address are present within WI-FI AP information collected from different facilities, it may be difficult to accurately determine or otherwise ascertain a facility in which the user is located. Therefore, as shown in operation 430, if the database configuring apparatus determines that the WI-FI APs have the same MAC address are present within WI-FI AP information collected from different facilities, then the database configuring apparatus proceeds to operation 440 to remove information associated with the corresponding WI-FI APs from the received WI-FI AP information. Otherwise, as shown in operation 430, if the database configuring apparatus determines that the WI-FI APs do not have the same MAC address are present within WI-FI AP information collected from different facilities, then the database configuring apparatus proceeds to end the method. In this example, even though the WI-FI APs having the same MAC address are present in the WI-FI AP information collected from the different facilities, the facilities may be located outside a predetermined and/or desired range. In this case, the database configuring apparatus may not remove information associated with the corresponding WI-FI APs.

Also, although not illustrated in FIG. 4, the database configuring apparatus may predict a MAC address of a WI-FI AP located at each facility by analyzing a pattern between MAC addresses of WI-FI APs collected from a plurality of facilities, and may add the predicted MAC address to the database, or may remove information associated with the WI-FI AP corresponding to the predicted MAC address from the WI-FI AP information collected from the plurality of facilities.

In general, one or more types of APs are associated with similar facilities, and thus, MAC addresses of WI-FI APs associated with similar facilities may have a predetermined and/or desired pattern. Accordingly, using the pattern, it is possible to infer and/or predict a MAC address that has not been collected from a platform of a subway station, and to add the inferred MAC address to the database. Additionally, the MAC address of a predetermined communication provider may be added to a black list, and black listed MAC addresses may be removed.

For example, in a case in which a WI-FI AP of a provider A associated with a subway station simultaneously uses frequency bands of 5 GHz and 2.4 GHz, a MAC address of a WI-FI AP using the frequency band of 5 GHz has a value of "+1" to a MAC address of a WI-FI AP using the frequency band of 2.4 GHz. For example, when 2.4 GHz WI-FI MAC address is "00:07:89:0F:D6:C0", 5 GHz WI-FI MAC address is "00:07:89:0F:D6:C1".

Also, in the case of the WI-FI AP of the provider A, one or two virtual addresses may be mapped to a single physical address. For example, when a MAC address starts with "00", the MAC address may be a physical address. When a MAC address starts with "02", "04", or "06", the MAC address may be a virtual address. Accordingly, when a physical MAC address, such as "00:07:89:0F:D6:C0", is mapped to a predetermined and/or desired WI-FI AP, a virtual addresses "02:07:89:0F:D6:C0" and "04:07:89:0F:D6:C0" may be set to the corresponding WI-FI AP.

Also, the case of the WI-FI AP of the provider A, a physical address starting with "00" may not be collected and only virtual addresses starting with "04" and "06", such as "04:17:B2:04:43:00" and "06:17:B2:04:43:01", may be collected.

In the case of a WI-FI AP of a provider B, a virtual address starting with "06" such as "06:17:B2:04:43:01" may have a pattern in which "+1" is added to a virtual address starting with "04" such as "04:17:B2:04:43:00".

Also, in the case of the WI-FI AP of the provider B, when a WI-FI AP having an SSID including a keyword corresponding to "WI-FI zone" is present, a WI-FI AP having an SSID "WI-FI zone_secure" is also present. In this example, when an address starting with "06" among virtual MAC addresses of the WI-FI AP including the keyword corresponding to "WI-FI zone" is "06:17:B2:04:43:01", a MAC address (06:17:B2:04:43:02) has a pattern in which "+1" is added to the corresponding address.

A database configured through the above example embodiments may be used to provide positional information. However, unfiltered mobile WI-FI AP information may still remain in the database. Accordingly, to measure a more accurate location of a user and to overcome an issue that may occur due to remaining mobile WI-FI AP information, the positional information providing method according to example embodiments may provide positional information using the method of FIG. 1.

To provide more accurate positional information, in various embodiments, the positional information providing method may determine a location of a user by comparing information associated with a plurality of WI-FI APs, collected from around a mobile terminal, with information stored in the database. For example, when the user collects information associated with a plurality of WI-FI APs, such as, MAC addresses using the mobile terminal, each of the collected plurality of sets of WI-FI AP information may be compared with WI-FI AP information stored in the database. In this example, when matching information is found, "+1" may be counted with respect to a facility corresponding to the found matching information to thereby store that the facility is selected once. Next, counting may be performed with respect to remaining sets of WI-FI AP information and a facility corresponding to the largest counting value may be returned to the user.

Figure 5:
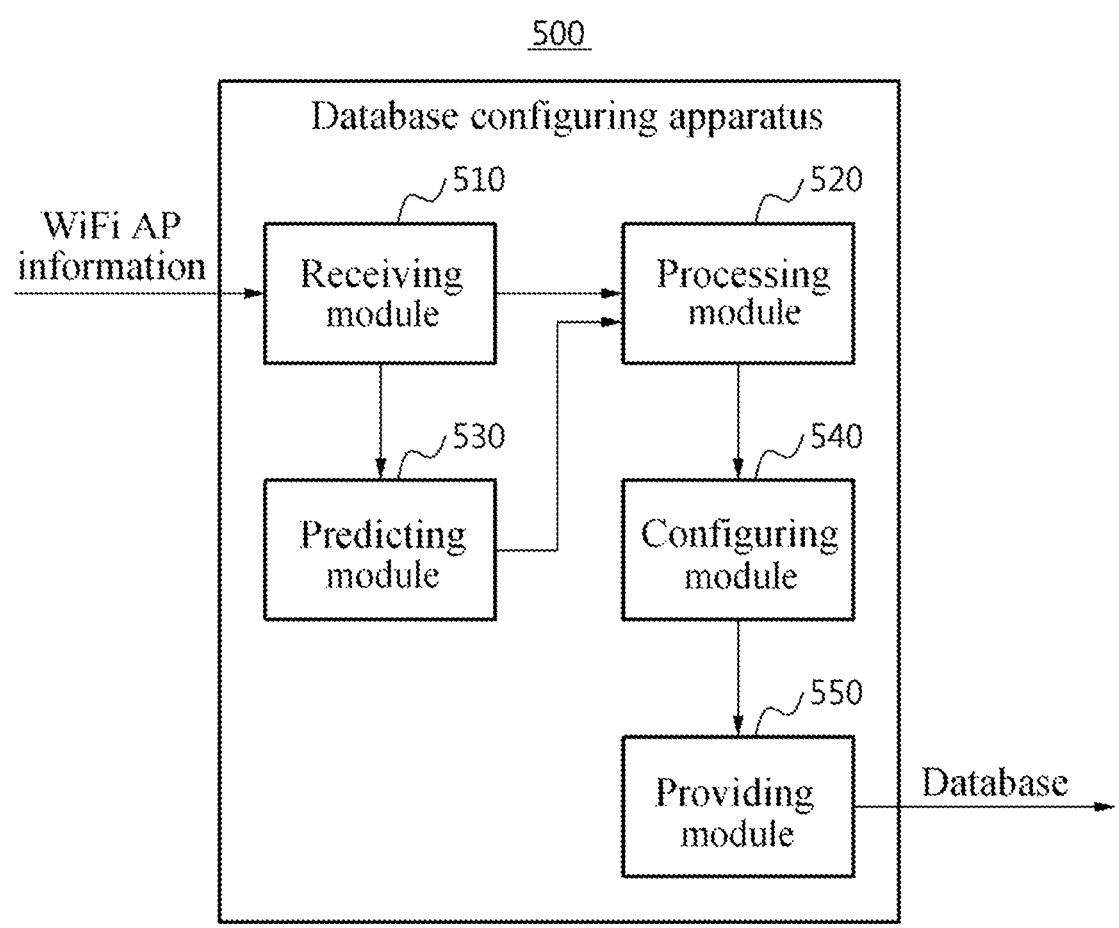
FIG. 5 is a block diagram illustrating an apparatus for configuring a database for providing positional information according to example embodiments.

FIG. 5 is a block diagram illustrating an apparatus for configuring a database for providing positional information according to an example embodiment.

A database configuring apparatus 500 may include a receiving unit 510, a processing module 520, a predicting module 530, a configuring module 540, and a providing module 550 so as to provide more accurate information. Database configuring apparatus 500 may include a physical computer hardware system (e.g., one or more processors, one or more data storage devices, and other like hardware components) that is configured to provide services for mobile terminals connected to a network. To this end, database configuring apparatus 500 may be configured to receive/send communication requests from/to mobile terminals. In some embodiments, database configuring apparatus 500 may include many more components than those shown in FIG. 5. However, it is not necessary that all of these generally conventional components be shown in order to disclose the example embodiments.

The receiving module 510 may receive WI-FI AP information collected from a plurality of facilities. For example, the receiving module 510 may receive information associated with a MAC address of each WI-FI AP, an SSID thereof, and a facility from which each WI-FI AP is collected.

The processing module 520 may process the collected WI-FI AP information by filtering mobile WI-FI AP information from the received WI-FI AP information and by mapping the filtered WI-FI AP information to information associated with a facility from which the filtered WI-FI AP information is collected.

For example, the processing module 520 may filter the mobile WI-FI AP information by searching the WI-FI AP information collected from the plurality of facilities for information associated with a WI-FI AP having an SSID including a predetermined keyword, and by removing the found WI-FI AP information from the WI-FI AP information received through the receiving module 510.

Also, the processing module 520 may remove, from the WI-FI AP information received through the receiving module 510, information associated with WI-FI APs having the same MAC address in the WI-FI AP information received through the receiving module 510. Here, only in a case in which the different facilities are located within a predetermined and/or desired range, for example, a range in which the location of the user may be erroneously determined, the processing module 520 may delete information associated with a corresponding WI-FI AP.

The predicting module 530 may predict a MAC address of a WI-FI AP located at each facility by analyzing a pattern between MAC addresses of WI-FI APs received through the receiving module 510. In this case, the processing module 520 may perform processing by adding the predicted MAC address to the WI-FI AP information received through the receiving module 510, or may remove information associated with the WI-FI AP corresponding to the predicted MAC address from the WI-FI AP information received through the receiving module 510.

The configuring module 540 may configure a database for providing positional information based on WI-FI information, based on the WI-FI AP information processed by the processing module 520. In various embodiments, configuring the database may include updating, altering, or otherwise changing one or more database attributes, records, relationships, ownerships, data, or other configuration items of the database.

The providing module 550 may provide the configured database to the mobile terminal for providing positional information. In various embodiments, the configured database may be in an encrypted library form. In various embodiments, the providing module 550 may provide the configured database to an application distributing apparatus configured to distribute an application for providing positional information so as to include the database in the application.

Figure 6:
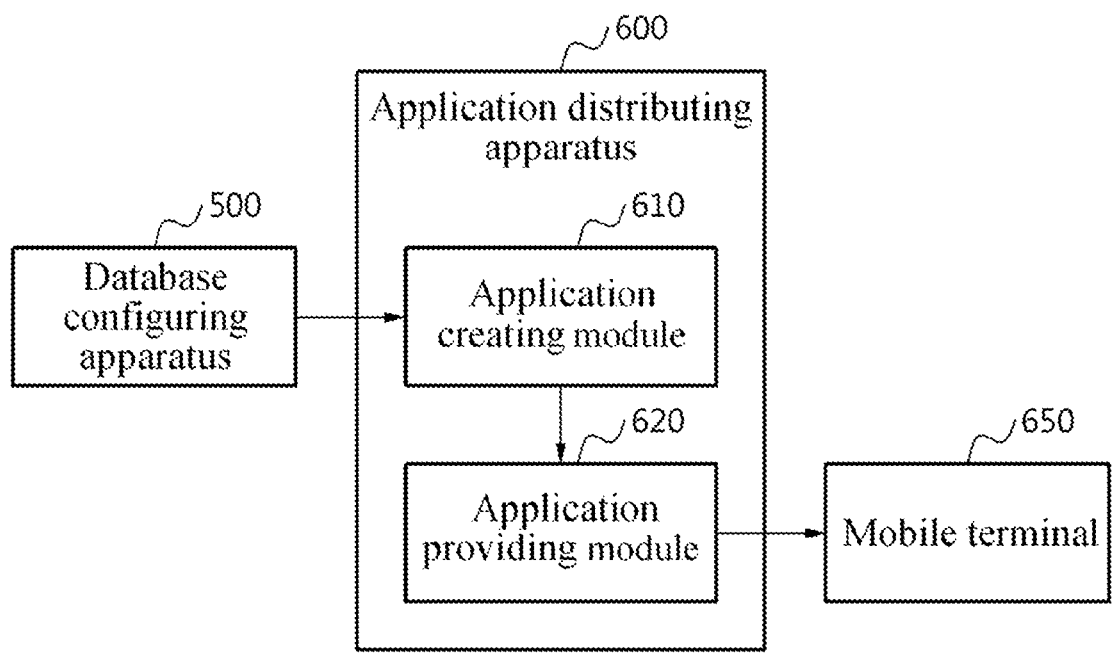
FIG. 6 is a block diagram illustrating an apparatus for distributing an application for providing positional information according to example embodiments.

FIG. 6 is a block diagram illustrating an apparatus for distributing an application for providing positional information according to an example embodiment.

An application distributing apparatus 600 may include an application creating module 610 to create an application including a database received from the database configuring apparatus 500, and an application providing module 620 to provide the configured application to a mobile terminal 650. Application distributing apparatus 600 may include a physical computer hardware system (e.g., one or more processors, one or more data storage devices, and other like hardware components) that is configured to provide one or more applications to mobile terminals connected to a network. To this end, application distributing apparatus 600 may be configured to receive/send communication requests from/to mobile terminals. In some embodiments, application distributing apparatus 600 may include many more components than those shown in FIG. 6. However, it is not necessary that all of these generally conventional components be shown in order to disclose the example embodiments.

For example, an application may include a code to collect WI-FI AP information by scanning a WI-FI AP in a vicinity of the mobile terminal, a code to extract information associated with a facility from which matching WI-FI AP information is collected by comparing the collected WI-FI AP information with WI-FI AP information pre-stored in a database, a code to determine a facility in which the mobile terminal 650 is located based on the extracted facility information, and a code to provide the facility information or provide a location based service based on the facility information. Accordingly, it is possible to provide a location based service to a user of the mobile terminal 650 which uses the application.

According to example embodiments, when information associated with a WI-FI AP located in a vicinity of a mobile terminal is collected, the collected WI-FI AP information may be compared with WI-FI AP information pre-stored in a database and information associated with a facility from which matching WI-FI AP information is collected may be extracted. A facility in which a mobile terminal is located may be determined based on the extracted facility information. Accordingly, positional information may be provided without requiring the use of a global positioning system (GPS), a cellular network, or requiring a separate measurement apparatus in an existing facility. Further, additional costs associated with configuring an infrastructure for a position information service may be reduced and/or eliminated.

According to example embodiments, positional information may be provided to a user offline without separately communicating with a server or without using a communication network by measuring a location of the user using a database included in a mobile terminal. Accordingly, cost occurring due to data transmission may be saved or reduced and an amount of time used for measurement may be decreased.

According to example embodiments, more accurate positional information may be provided to a user by filtering mobile WI-FI AP information in the case of configuring a database, and by including uncollected WI-FI AP information in the case of collecting WI-FI AP information.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules so as to perform the operations of the above-described embodiments.

It will be apparent to those skilled in the art that various modifications and variation can be made in the example embodiments without departing from the spirit or scope of the invention. Thus, it is intended that the example embodiments cover the modifications and variations of this invention provided they come within the scope of the appended claims and their equivalents.

What is claimed is:

1. A method of determining positional information using a mobile terminal, the method comprising:
    collecting, by the mobile terminal, wireless network access point (AP) information by scanning for a wireless network AP in a vicinity of the mobile terminal, the wireless network AP being associated with a facility;
    extracting, by the mobile terminal, facility information associated with the facility, the extracting including,
        comparing the collected wireless network AP information with wireless network AP information stored in a database, each of the stored wireless network AP information being associated with at least one facility,
        determining the at least one facility that matches the collected wireless network AP information based on the comparing,
        extracting facility information according to the determined at least one match,
        determining a pattern between MAC addresses of the wireless network AP information collected from the plurality of facilities, and
        predicting a MAC address for each of the collected wireless network APs based on the determined pattern; and
    determining, by the mobile terminal, the positional information of the mobile terminal based on the extracted facility information.

2. The method of claim 1, wherein the extracting includes:
    filtering information associated with a wireless network AP corresponding to the predicted MAC address from the wireless network AP information collected from the plurality of facilities.

3. The method of claim 1, wherein the collecting comprises:
    obtaining a media access control (MAC) address of the wireless network AP in the vicinity of the mobile terminal.

4. The method of claim 1, wherein
    the wireless network AP is one among a plurality of wireless network APs, some of the plurality of wireless network APs being in the vicinity of the mobile terminal, each of the plurality of wireless network APs being associated with wireless network AP information; and
    the collecting includes collecting the wireless network AP information of the plurality of wireless network APs that are in the vicinity of the mobile terminal.

5. The method of claim 1, wherein the determining the positional information includes:
    counting a number of times that the facility information is extracted; and
    determining that the positional information is a location within or around the facility based on the counting.

6. The method of claim 1, further comprising:
    adding the extracted facility information to a candidate location of the mobile terminal; and
    determining that the candidate location of the mobile terminal to be the positional information if the comparison does not yield at least one match.

7. The method of claim 1, wherein the database includes wireless network AP information collected from a plurality of facilities, each of the plurality of facilities including at least one of stationary wireless network APs and mobile wireless network APs.

8. The method of claim 1, wherein each collected wireless network AP information includes a service set identifier (SSID) including at least one keyword.

9. A non-transitory computer-readable recording medium storing a program for providing facility information to a mobile terminal, wherein when the program is executed by at least one processor of the mobile terminal, the processor is configured to:
    collect wireless network access point (AP) information by scanning for a wireless network AP in a vicinity of the mobile terminal, the wireless network AP being associated with a facility;
    extract facility information associated with the facility, the extract includes,
        compare the collected wireless network AP information with wireless network AP information stored in a database, each of the stored wireless network AP information being associated with at least one facility,
        determine the at least one facility that matches the collected wireless network AP information based on the compare,
        extract facility information according to the determined at least one match,
        determine a pattern between MAC addresses of the wireless network AP information collected from the plurality of facilities, and
        predict a MAC address for each of the collected wireless network APs based on the determined pattern; and
    determine positional information of the mobile terminal based on the extracted facility information.

10. The non-transitory computer-readable recording medium of claim 9, wherein the extract includes:
    filter information associated with a wireless network AP corresponding to the predicted MAC address from the wireless network AP information collected from the plurality of facilities.

11. The non-transitory computer-readable recording medium of claim 9, wherein collect (the collecting) includes:
    obtaining a media access control (MAC) address of the wireless network AP in the vicinity of the mobile terminal.

12. The non-transitory computer-readable recording medium of claim 9, wherein
    the wireless network AP is one among a plurality of wireless network APs, some of the plurality of wireless network APs being in the vicinity of the mobile terminal, each of the plurality of wireless network APs being associated with wireless network AP information; and
    the collect(ing) includes collecting the wireless network AP information of the plurality of wireless network APs that are in the vicinity of the mobile terminal.

13. An apparatus for distributing an application for providing facility information to a mobile terminal when the application is executed by at least one first processor of the mobile terminal, the apparatus comprising:
    at least one second processor of the apparatus configured to execute computer readable instructions to provide the application to the mobile terminal; and
    when the mobile terminal is provided with the application, the mobile terminal is configured to, collect wireless network access point (AP) information by scanning for a wireless network AP in a vicinity of the mobile terminal, the wireless network AP being associated with a facility, extract facility information associated with the facility, the extract includes, compare the collected wireless network AP information with wireless network AP information stored in a database, each of the stored wireless network AP information being associated with at least one facility, determine the at least one facility that matches the collected wireless network AP information based on the compare, extract facility information according to the determined at least one match, determine a pattern between MAC addresses of the wireless network AP information collected from the plurality of facilities, and predict a MAC address for each of the collected wireless network APs based on the determined pattern; and determine a positional information of the mobile terminal based on the extracted facility information.

14. The apparatus of claim 13, wherein the extract includes:

filter information associated with a wireless network AP corresponding to the predicted MAC address from the wireless network AP information collected from the plurality of facilities.

15. The apparatus of claim 13, wherein the collect(ing) comprises: obtaining a media access control (MAC) address of the wireless network AP in the vicinity of the mobile terminal.

16. The apparatus of claim 13, wherein the wireless network AP is one among a plurality of wireless network APs, some of the plurality of wireless network APs being in the vicinity of the mobile terminal, each of the plurality of wireless network APs being associated with wireless network AP information; and the collect(ing) includes collecting the wireless network AP information of the plurality of wireless network APs that are in the vicinity of the mobile terminal.

17. The apparatus of claim 13, wherein the determination of the positional information includes:

counting a number of times that the facility information is extracted; and determining that the positional information is a location within or around the facility based on the counting.

18. The apparatus of claim 13, wherein the mobile terminal is further configured to:

add the extracted facility information to a candidate location of the mobile terminal; and determine that the candidate location of the mobile terminal to be the positional information if the comparison does not yield at least one match.

19. The apparatus of claim 13, wherein the database includes wireless network AP information collected from a plurality of facilities, each of the plurality of facilities including at least one of stationary wireless network APs and mobile wireless network APs.

20. The apparatus of claim 13, wherein each collected wireless network AP information includes a service set identifier (SSID) including at least one keyword.

* * * * *